US010421459B2

(12) United States Patent
Goldman-Shenhar et al.

(10) Patent No.: US 10,421,459 B2
(45) Date of Patent: Sep. 24, 2019

(54) CONTEXTUAL-ASSESSMENT VEHICLE SYSTEMS

(71) Applicant: GM Global Technology Operations LLC, Detroit, MI (US)

(72) Inventors: Claudia V. Goldman-Shenhar, Mevasseret Zion (IL); Yael Shmueli Friedland, Tel Aviv (IL); Ariel Lipson, Tel Aviv (IL); Dan Levi, Kyriat Ono (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 15/385,398

(22) Filed: Dec. 20, 2016

(65) Prior Publication Data

US 2018/0173230 A1    Jun. 21, 2018

(51) Int. Cl.
*B60W 40/08*    (2012.01)
*G08G 1/16*    (2006.01)
(Continued)

(52) U.S. Cl.
CPC ............ *B60W 40/08* (2013.01); *B60K 28/06* (2013.01); *B60W 30/08* (2013.01); *B60W 50/08* (2013.01);
(Continued)

(58) Field of Classification Search
CPC ............ G08G 1/167; G08G 1/096725; G08G 1/096838; B60W 40/08; B60W 40/09; B60W 2540/30; B60W 50/08; B60W 2540/00; B60W 50/14; B60W 2040/0809; B60W 2040/0827; B60W 2050/143; B60W 2550/10; B60W 2550/12; B60W 30/08; B60W 2750/40; G01C 21/3697; G01C 21/3617; B60K 28/06

See application file for complete search history.

(56) References Cited

U.S. PATENT DOCUMENTS

7,579,942 B2    8/2009    Kalik
7,639,148 B2    12/2009    Victor
(Continued)

*Primary Examiner* — Jason Holloway
(74) *Attorney, Agent, or Firm* — Cantor Colburn LLP (57) ABSTRACT

A user-centric driving-support system for implementation at a vehicle of transportation. The system in various embodiments includes one or more vehicle sensors, such as a camera, a RADAR, and a LiDAR, and a hardware-based processing unit. The system further includes a non-transitory computer-readable storage device including an activity unit and an output-structuring unit. The activity unit, when executed by the hardware-based processing unit, determines, based on contextual input information, at least one of an alert-assessment output and a scene-awareness output, wherein the contextual input information includes output of the vehicle sensor. The output-structuring unit, when executed by the hardware-based processing unit, determines an action to be performed at the vehicle based on at least one of the alert-assessment output and the scene-awareness output determined by the activity unit. The technology in various implementations includes the storage device, alone, and user-centric driving-support processes performed using the device and other vehicle components.

17 Claims, 4 Drawing Sheets

(51) Int. Cl.
  *B60W 50/08* (2012.01)
  *B60W 30/08* (2012.01)
  *B60W 50/14* (2012.01)
  *B60K 28/06* (2006.01)
  *G08G 1/0967* (2006.01)
  *G01C 21/36* (2006.01)

(52) U.S. Cl.
  CPC ............ *B60W 50/14* (2013.01); *G08G 1/167* (2013.01); *B60W 2050/143* (2013.01); *B60W 2540/00* (2013.01); *B60W 2550/10* (2013.01); *B60W 2750/40* (2013.01); *G01C 21/3617* (2013.01); *G01C 21/3697* (2013.01); *G08G 1/096725* (2013.01)

(56) References Cited

U.S. PATENT DOCUMENTS

| | | |
|---|---|---|
| 8,068,968 B2 | 11/2011 | Kondoh |
| 8,514,099 B2 | 8/2013 | Seder et al. |
| 9,135,825 B2 | 9/2015 | Nagata |
| 2012/0016581 A1* | 1/2012 | Mochizuki ............ G08G 1/161 |
| | | 701/301 |
| 2012/0212353 A1* | 8/2012 | Fung ...................... B60K 28/06 |
| | | 340/905 |
| 2013/0226408 A1* | 8/2013 | Fung .................... B60W 40/09 |
| | | 701/41 |
| 2014/0309870 A1* | 10/2014 | Ricci ...................... H04W 4/21 |
| | | 701/36 |
| 2015/0039186 A1* | 2/2015 | Okuda ................... B60W 50/14 |
| | | 701/41 |
| 2015/0051781 A1* | 2/2015 | Schnieders ........... B60W 30/00 |
| | | 701/23 |
| 2015/0057891 A1* | 2/2015 | Mudalige .............. B60W 10/00 |
| | | 701/42 |
| 2015/0061895 A1* | 3/2015 | Ricci ...................... H04W 4/90 |
| | | 340/902 |
| 2016/0193921 A1* | 7/2016 | Suzuki ................... B60K 35/00 |
| | | 701/36 |
| 2016/0297439 A1* | 10/2016 | Inoue ................... B60W 10/184 |
| 2017/0132934 A1* | 5/2017 | Kentley ................. G08G 1/202 |
| 2017/0364082 A1* | 12/2017 | Taieb ...................... G01C 21/32 |
| 2018/0029607 A1* | 2/2018 | Khalifeh ............ G01C 21/3697 |

\* cited by examiner

CONTEXTUAL-ASSESSMENT VEHICLE SYSTEMS

TECHNICAL FIELD

The present disclosure relates generally to vehicle driving systems and, more particularly, to systems and methods for assessing a driving situation based on user context, driving context, and/or environmental clutter.

BACKGROUND

This section provides background information related to the present disclosure which is not necessarily prior art.

Sensor output is used increasingly in modern driving. Information from cameras, RADAR, and LiDAR, for example, is provided to a vehicle driver or used by autonomous driving system.

In various applications, sensor information is fused to compute a standard object list. The standard object list identifies, for instance, nearby vehicles and pedestrians sensed.

A time-to-collision (TTC) value can be determined with respect to each object of the standard object list considering simply dynamics—relative positioning and movement.

SUMMARY

Improved driving assistance is provided using user-context, driving-context, and/or environment-clutter data.

In various aspects, the present technology relates to a user-centric driving-support system for implementation at a vehicle of transportation. The system in various embodiments includes a hardware-based processing unit and one or more vehicle sensors, such as a camera, a RADAR, and a LiDAR. The system further includes a non-transitory computer-readable storage device including an activity unit and an output-structuring unit. The activity unit, when executed by the processing unit, determines, based on contextual input information, at least one of an alert-assessment output and a scene-awareness output. The contextual input information includes or is generated using output of the vehicle sensor.

The output-structuring unit, when executed, determines an action to be performed at the vehicle based on at least one of the alert-assessment output and the scene-awareness output determined by the activity unit.

In various embodiments, the contextual input information includes user context, relating to a state or condition of a user of the vehicle.

The state or condition of the user is determined based on (i) biometric data from user measurements, (ii) user activity, (iii) vehicle occupancy, and/or (iv) user eye gaze, in various embodiments.

In some cases, the state or condition is generated based at least in part on at least one user model.

The user model may be stored at the vehicle, at a user mobile device, or at a remote server, as just a few examples. The user model includes data indicative of present or past actions, tendencies, reactions or other interactions (with vehicle or other stimuli), preferences, the like, and other characteristics related to a present, subject, user and/or other users. The user model data used can be present data, obtained and considered by the vehicle system in real-time, and/or historic data regarding the subject user and/or other vehicle users.

Historic data may be used, for instance, as a basis for adjusting or interpreting the present and/or past actions of or interactions with the subject user. Use of historic data is described more below.

In various embodiments, the contextual input information includes driving context, relating to present driving conditions for the vehicle.

The contextual input information includes clutter information, relating to an amount of visual items in an environment outside of the vehicle for the vehicle sensor or the user to sense, in various embodiments.

In various embodiments, the alert-assessment output comprises an alert-assessment score.

The activity unit, when executed by the hardware-based processing unit (i) receives a base object list, prepared based at least on output of the vehicle sensor, and (ii) adjusts the base object list, based on the contextual input information, yielding an adjusted object list constituting the scene-awareness output, in various embodiments.

In various embodiments, the action determined by the output-structuring unit comprises controlling any of (i) a timing by which a driving-related notification is delivered by way of a vehicle output device, (ii) a substance of the driving-related notification, (iii) a modality or modalities for the notification, and (iv) an amount or type of emphasis for the notification.

The action determined by the output-structuring unit comprises controlling an automated driving component of the vehicle, in various embodiments.

In various embodiments, the action determined by the output-structuring unit comprises generating a communication for delivery to a destination computing device other than of the vehicle.

Various aspects of the present technology include non-transitory computer-readable storage devices, processing units, and algorithms configured to perform any of the operations described.

Other aspects of the present technology will be in part apparent and in part pointed out hereinafter.

DESCRIPTION OF THE DRAWINGS

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. TECHNOLOGY INTRODUCTION

The present disclosure describes, by various embodiments, systems and methods for assessing a driving situation based on user context, driving context, and/or environmental clutter.

User-context information indicates one or more factors affecting a user's ability to make decisions relating to driving or vehicle operation. The term user includes a person fully operating the vehicle or a person partially operating the vehicle using partial autonomous driving, or a person using fully autonomous driving. The term driver may be used herein interchangeably with user, and so can also refer to a person using fully autonomous functions. The term driver can also refer to a relevant vehicle system(s) in implementations in which the vehicle performs partial or fully autonomous functions. For instance, if a component or unit of the present technology outputs a notification of an imminent threat—nearby vehicle or large pothole, for instance—the notification can be said to be provided to the driver or user, representing a human operator, a human user (e.g., person available to take control of the vehicle or providing instructions to the vehicle driving autonomously), and/or relevant vehicle system(s).

Generally, user-context information includes user activities or related situations that takes some of the user's attention away from the driving scene, whether the user is partially, fully, or not driving (e.g., during autonomous driving) the vehicle at the time. Example user context includes the user participating in a phone call or otherwise using a personal device or implement—e.g., book. As another example, user context involves others being in the vehicle and possibly also any interactions between them and the driver, such as an infant being present, and crying, or an adult being present and talking with the driver.

User context in various embodiments also includes mental or other physical characteristics of the user. As an example, the system may consider as user context, known user sight or hearing limitations. As another example, user-context may include known or determined slow or impaired user reflexes or ability to respond to stimuli, such as a needed driving maneuver or a stimuli inviting the user to make a decision related to autonomous driving.

In various implementations, user context can also include settings or parameters of the user model. The system may be configured to set present values or other data, or estimate or predict values, related to the user—such as values or data indicating user attention level, whether the user notices an object in the driving scene, etc. In various implementations, values or data is estimated or predicted with some acceptable level of uncertainty, but the system may determine that the values or data has at least sufficient certainty before using the values or data.

Other input to decision making units relating to the environment and driving conditions, such as environmental clutter or road or weather conditions are in some embodiments incorporated into user context.

The system in various embodiments uses user-centric threat assessment, or alert-assessment, functions to determine a value or score. The user-centric alert-assessment score can be used by the system, or other apparatus—such as nearby vehicles or pedestrian phone—in determining next actions.

Next actions may include, for instance, controlling the vehicle, initiating communications to the user, and initiating control of operation of, or communications to (and possibly to and from), the other apparatus.

The term environmental clutter refers generally to scenarios in which an environment near the vehicle, sensed by vehicle sensor(s), has a relatively high amount of visual information to be processed by the user in assessing the environment for driving purposes. A scene around a vehicle driving or being driven in Times Square, New York, with many signs, pedestrians, taxis, and other vehicles would typically have more environmental clutter than a scene on a drive out in the country, for instance.

Clutter information in various embodiments includes an amount of relevant objects—e.g., other vehicles, pedestrians, potholes—such as in a field of view. In contemplated implementations, the clutter information can also indicate other quality/ies of the object, such as relating to item location. The clutter information may include data indicating clustering of objects, locations of any object or cluster, distinctions indicating which objects or clusters are more threatening or important, such as by being in, or predicted to be in, a vehicle path versus objects that are and are expected to stay adjacent the vehicle path.

The clutter measure is in various embodiments used to estimate a probability or likelihood that the driver is aware of one or more of the objects in the driving environment. Generally, with higher clutter, the probability that the driver notices any object would be lower. The probability is used in determining an alert strategy by which the driver is advised about the object(s).

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, busses, trolleys, trains, commercial or manufacturing equipment (for example, forklift), construction machines, and agricultural machinery, warehouse equipment, home appliances, personal or mobile computing devices, the like, and other.

II. HOST VEHICLE—FIG. 1

Figure 1:
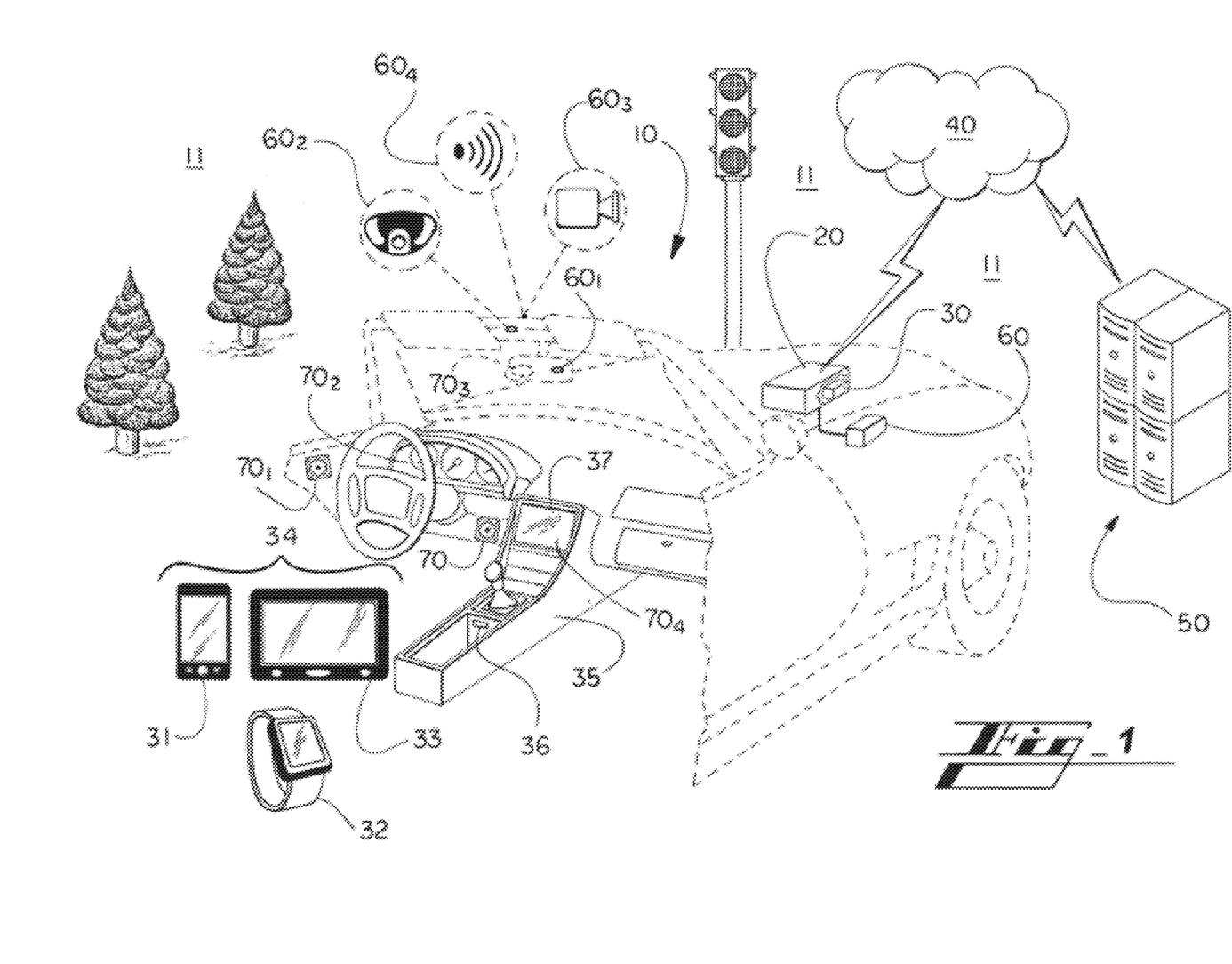
FIG. 1 illustrates schematically an example vehicle of transportation, with local and remote computing devices, according to embodiments of the present technology.

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communication sub-system 30 for communicating with mobile or local computing devices 34 and external networks 40.

By the external networks 40, such as the Internet, a local-area, cellular, or satellite network, vehicle-to-vehicle, pedestrian-to-vehicle, road-side infrastructure networks, the like or other, the vehicle 10 can reach mobile or local systems 34 or remote systems 50, such as remote servers.

Example mobile or local devices 34 include a user smartphone 31, a first example user wearable device 32 in the form of a smart watch, and a second example user wearable device 33 in the form of a tablet, and are not limited to these examples. Other example wearables 32, 33 include smart apparel, such as a shirt or belt, an accessory such as arm strap, or smart jewelry, such as earrings, necklaces, and lanyards.

Another example mobile or local device is a user plug-in device, such as a USB mass storage device, or such a device configured to communicate wirelessly.

Still another example mobile or local device is an on-board device (OBD) (not shown in detail), such as a wheel sensor, a brake sensor, an accelerometer, a rotor-wear sensor, a throttle-position sensor, a steering-angle sensor, a revolutions-per-minute (RPM) indicator, a brake-torque sensors, other vehicle state or dynamics-related sensor for the vehicle, with which the vehicle is retrofitted with after manufacture. The OBD(s) can include or be a part of the sensor sub-system referenced below by numeral 60.

The vehicle controller system 20, which in contemplated embodiments includes one or more microcontrollers, can communicate with OBDs via a controller area network (CAN) and/or Ethernet. The CAN/Ethernet message-based protocol is typically designed for multiplex electrical wiring with automobiles, and CAN/ETHERNET infrastructure may include a CAN/ETHERNET bus. The OBD can also be referred to as vehicle CAN/ETHERNET interface (VCI, VEI, etc.) components or products, and the signals transferred by the CAN/ETHERNET may be referred to as CAN/ETHERNET signals. Communications between the OBD(s) and the primary controller or microcontroller 20 are in other embodiments executed via similar or other message-based protocol.

The vehicle 10 also has various mounting structures 35. The mounting structures 35 include a steering wheel, a central console, and a dashboard or instrument panel. The mounting structures 35 also include or host a plug-in port 36—a USB port, for instance—and a visual display 37, such as a touch-sensitive, input/output, human-machine interface (HMI).

The vehicle 10 also has a sensor sub-system including sensors providing information to the controller 20. Sensor input to the controller 20 is shown schematically at the right, under the vehicle hood, of FIG. 1. Example sensors having base numeral 60—$60_1$, $60_2$, etc.—are shown.

Sensor data relates to features such as vehicle operations, vehicle position, and vehicle pose, user characteristics, such as biometrics or physiological measures, and environmental-characteristics pertaining to a vehicle interior or outside of the vehicle 10.

Example sensors include a camera $60_1$ positioned in a rear-view mirror of the vehicle 10, a dome or ceiling camera $60_2$ positioned in a header of the vehicle 10, a world-facing camera $60_3$ (facing away from vehicle 10), and a world-facing range sensor $60_4$. Intra-vehicle-focused sensors $60_1$, $60_2$, such as cameras, and microphones, are configured to sense presence of people, activities or people, or other cabin activity or characteristics. The sensors can also be used for authentication purposes, in a registration or re-registration routine. This subset of sensors are described more below.

World-facing sensors $60_3$, $60_4$ sense characteristics about an environment 11 comprising, for instance, billboards, buildings, other vehicles, traffic signs, traffic lights, road conditions, obstacles, pedestrians, etc.

The OBDs mentioned can be considered as local devices, sensors of the sub-system 60, or both in various embodiments.

Local devices 34—for instance, user phone, user wearable, or user plug-in device—can be considered as sensors 60 as well, such as in embodiments in which the vehicle 10 uses data provided by the local device based on output of a local-device sensor(s). The vehicle system can use data from a user smartphone, for instance, indicating user-physiological data sensed by a biometric sensor of the phone.

The vehicle 10 also includes cabin output components 70, such as audio speakers $70_1$, and an instruments panel or display $70_2$. The output components may also include a dash or center-stack display screen $70_3$, a rear-view-mirror screen $70_4$ (for displaying imaging from a vehicle aft/backup camera), any vehicle visual display device 37, autonomous driving components (steering, braking, etc.), and control components, for controlling any of these.

III. ON-BOARD COMPUTING ARCHITECTURE—FIG. 2

Figure 2:
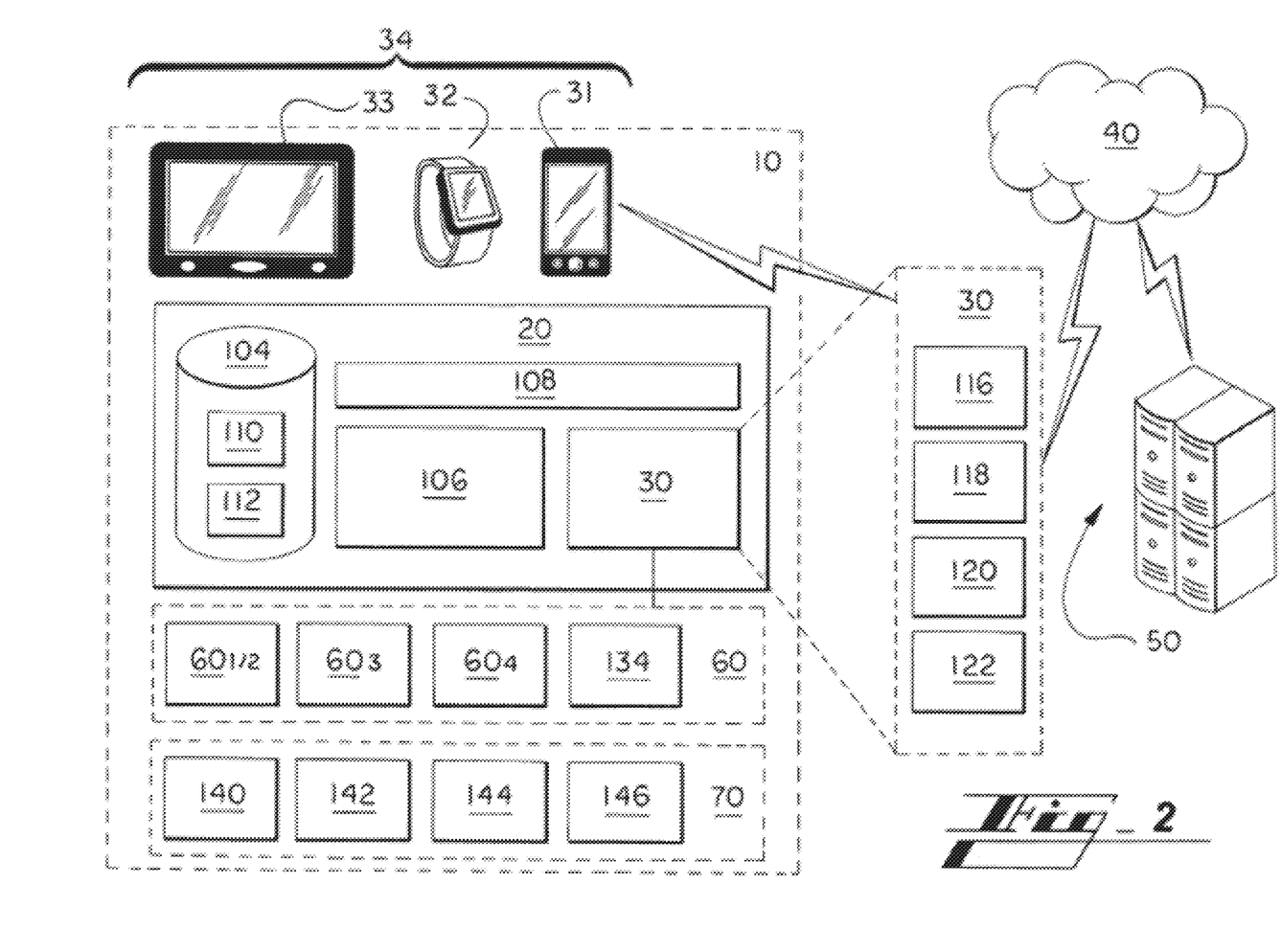
FIG. 2 illustrates schematically some details of an example vehicle computer of FIG. 1 in communication with the local and remote computing devices.

FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is, in various embodiments, part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 can include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage units or modules 110 storing computer-readable code or instructions executable by the processing unit 106 to perform the functions of the controller system 20 described herein. The units or modules and functions are described further below in connection with FIGS. 3 and 4.

The data storage device 104 in some embodiments also includes ancillary or supporting components 112, such as additional software and/or data supporting performance of the processes of the present disclosure, such as one or more user profiles or a group of default and/or user-set preferences.

As provided, the controller system 20 also includes a communication sub-system 30 for communicating with local and external devices and networks 34, 40, 50. The communication sub-system 30 in various embodiments includes any of a wire-based input/output (i/o) 116, at least one long-range wireless transceiver 118, and one or more short- and/or medium-range wireless transceivers 120. The component 122 is shown by way of example to emphasize that the system can be configured to accommodate one or more other types of wired or wireless communications.

The long-range transceiver 118 is in some embodiments configured to facilitate communications between the controller system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 20 can, by operation of the processor 106, send and receive information, such as in the form of messages or packetized data, to and from the communication network(s) 40.

Remote devices 50 with which the sub-system 30 communicates are in various embodiments nearby the vehicle 10, remote to the vehicle, or both.

The remote devices 50 can be configured with any suitable structure for performing the operations described herein. Example structure includes any or all structures like those described in connection with the vehicle computing device 20. A remote device 50 includes, for instance, a processing unit, a storage medium comprising units or modules, a communication bus, and an input/output communication structure. These features are considered shown for the remote device 50 by FIG. 1 and the cross-reference provided by this paragraph.

While local devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A user computing or electronic device 34, such as a smartphone, can also be remote to the vehicle 10, and in communication with the sub-system 30, such as by way of the Internet or other communication network 40.

An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 comprising sensors providing information to the controller system 20 regarding items such as vehicle operations, vehicle position, vehicle pose, user characteristics, such as biometrics or physiological measures, and/or the environment about the vehicle 10. The arrangement can be configured so that the controller system 20 communicates with, or at least receives signals from sensors of the sensor sub-system 60, via wired or short-range wireless communication links 116, 120.

In various embodiments, the sensor sub-system 60 includes at least one camera and at least one range sensor $60_4$, such as radar or sonar, directed away from the vehicle, such as for supporting autonomous driving. In some embodiments a camera is used to sense range.

Visual-light cameras $60_3$ directed away from the vehicle 10 may include a monocular forward-looking camera, such as those used in lane-departure-warning (LDW) systems. Embodiments may include other camera technologies, such as a stereo camera or a trifocal camera.

Sensors configured to sense external conditions may be arranged or oriented in any of a variety of directions without departing from the scope of the present disclosure. For example, the cameras $60_3$ and the range sensor $60_4$ may be oriented at each position, or a select position, of (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor $60_4$ may include any of a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include the mentioned cabin sensors ($60_1$, $60_2$, etc.) configured and arranged (for instance, positioned and fitted in the vehicle) to sense activity, people, cabin environmental conditions, or other features relating to the interior of the vehicle. Example cabin sensors ($60_1$, $60_2$, etc.) include microphones, in-vehicle visual-light cameras, seat-weight sensors, user salinity, retina or other user characteristics, biometrics, or physiological measures, and/or the environment about the vehicle 10.

The cabin sensors ($60_1$, $60_2$, etc.), of the vehicle sensors 60, may include one or more temperature-sensitive cameras (for instance, visual-light-based (3D, RGB, RGB-D), infra-red or thermographic) or sensors. In various embodiments, cameras are positioned preferably at a high position in the vehicle 10. Example positions include on a rear-view mirror and in a ceiling compartment.

A higher positioning reduces interference from lateral obstacles, such as front-row seat backs blocking second- or third-row passengers, or blocking more of those passengers. A higher positioned camera (light-based (for instance, RGB, RGB-D, 3D, or thermal or infra-red) or other sensor will likely be able to sense temperature of more of each passenger's body—for example, torso, legs, feet.

Two example locations for the camera(s) are indicated in FIG. 1 by reference numeral $60_1$, $60_2$, etc.—on at rear-view mirror and one at the vehicle header.

Other example sensor sub-systems 60 include dynamic vehicle sensors 134, such as an inertial-momentum unit (IMU), having one or more accelerometers, a wheel sensor, or a sensor associated with a steering system (for example, steering wheel) of the vehicle 10.

The sensors 60 can include any sensor for measuring a vehicle pose or other dynamics, such as position, speed, acceleration, or height—for instance, vehicle height sensor.

The sensors 60 can include any known sensor for measuring an environment of the vehicle, including those mentioned above, and others such as a precipitation sensor for detecting whether and how much it is raining or snowing, a temperature sensor, and any other.

Sensors for sensing user characteristics include any biometric or physiological sensor, such as a camera used for retina or other eye-feature recognition, facial recognition, or fingerprint recognition, a thermal sensor, a microphone used for voice or other user recognition, other types of user-identifying camera-based systems, a weight sensor, breath-quality sensors (for instance, breathalyzer), a user-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), a sensor measuring salinity level, the like, or other.

User-vehicle interfaces, such as a touch-sensitive display 37, buttons, knobs, the like, or other can also be considered part of the sensor sub-system 60.

FIG. 2 also shows the cabin output components 70 mentioned above. The output components in various embodiments include a mechanism for communicating with vehicle occupants. The components include but are not limited to audio speakers 140, visual displays 142, such as the instruments panel, center-stack display screen, and rear-view-mirror screen, and haptic outputs 144, such as steering wheel or seat vibration actuators. The fourth element 146 in this section 70 is provided to emphasize that the vehicle can include any of a wide variety of other output components, such as vehicle control components, such as autonomous steering, braking or other autonomous-driving controls or components.

IV. ADDITIONAL VEHICLE COMPONENTS—FIG. 3

Figure 3:
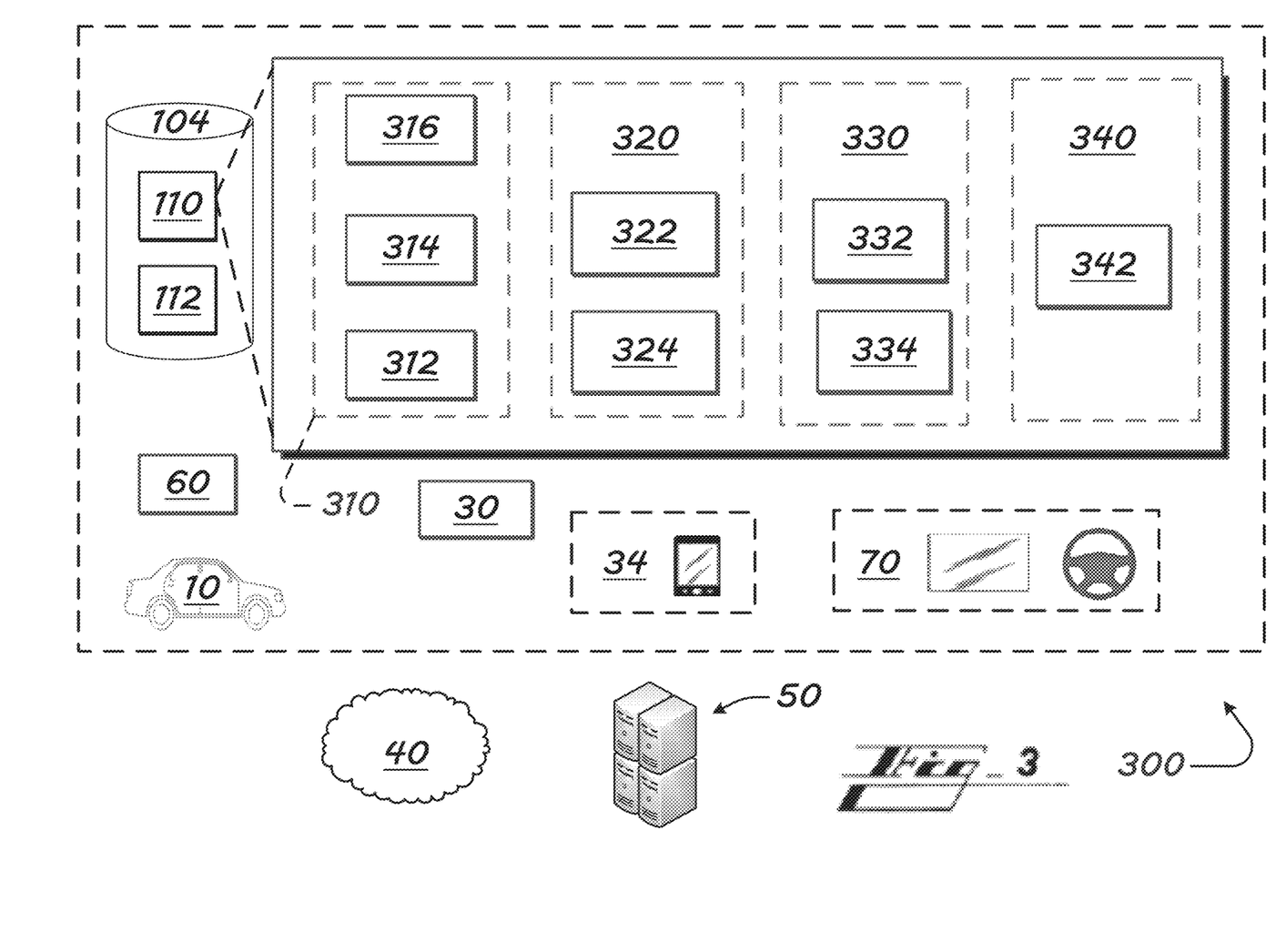
FIG. 3 shows another view of the vehicle, emphasizing example memory components including system units.

FIG. 3 shows an alternative view 300 of the vehicle 10 of FIGS. 1 and 2 emphasizing example memory components, and showing associated devices.

As mentioned, the data storage device 104 includes one or more units or modules 110 for performing the processes of the present disclosure. And the device 104 may include ancillary components 112, such as additional software and/or data supporting performance of the processes of the present disclosure. The ancillary components 112 can include, for example, additional software and/or data supporting performance of the processes of the present disclosure, such as one or more user profiles or a group of default and/or user-set preferences.

Example user profile data includes data received or generated by the vehicle processor indicating characteristics of the user, such as whether the driver is temporarily impaired, or has some sort of disability affecting driving, even if slight, such as limited sight or hearing. Characteristics can be indicated by data received from a remote server 50, for instance.

Any of the code or instructions described can be part of more than one units or module. And any functions described herein can be performed by execution of instructions in one or more units or modules, though the functions may be described primarily in connection with one module by way of primary example. Each of the units, sub-units, modules and sub-modules can be referred to by any of a variety of names, such as by a term or phrase indicative of its function.

Sub-units or sub-modules can cause the processing hardware-based unit 106 to perform specific operations or routines of unit or module functions. Each sub-unit or sub-module can also be referred to by any of a variety of names, such as by a term or phrase indicative of its function.

Example units 110 and constituent sub-units include:
Input Unit 310
   a visual-clutter sub-unit 312;
   a driver-context sub-unit 314;
   a driving context sub-unit 316;
Activity Unit 320
   a user-centric threat, or alert, assessment sub-unit 322;
   a scene-awareness estimation unit 324;
Output-Structuring Unit 330
   threat-assessment, or alert-assessment, output sub-unit 332, which may include, for instance, an automated-decision support sub-system;
   scene-awareness output sub-unit 334, which may include the same or separate automated-decision support sub-system; and
Implementation Unit 340
   an output-interface sub-unit 342.

Other vehicle components shown in FIG. 3 include the vehicle communications sub-system 30 and the vehicle sensor sub-system 60. These sub-systems act at least in part as input sources to the units 110, and particularly to the input-interface sub-module 312.

Example inputs from the communications sub-system 30 include user-characteristic data, indicating user qualities such as age, gender, mood, attention capacity or limitation, hearing or sight limitation, the like or other.

Factor may be provided according to any suitable format, scale, or protocol. For instance, an attention capacity can be provided on a scale of 1 to 10. A mood factor may be provided on a scale, as well, or by categories—e.g., normal, tired, worried, angry, etc.

The communication sub-system 30 receives and provides to the input unit 410 data from any of a wide variety of sources, including sources separate from the vehicle 10, such as local or mobile devices 34, devices worn by pedestrians, other vehicle systems, local infrastructure (local beacons, cellular towers, etc.), satellite systems, and remote systems 50, providing any of a wide variety of information, such as user-identifying data, user-history data, user selections or user preferences, driving-context data (weather, road conditions, construction on the road, navigation, etc.), user-context data (driver sight or hearing impairments, driver on the phone, ambient noise high, the like or other), program or system updates—remote systems can include, for instance, applications servers corresponding to application(s) operating at the vehicle 10 and any relevant user devices 34, computers of a user or supervisor (parent, work supervisor), vehicle-operator servers, customer-control center system, such as systems of the OnStar® control center mentioned, or a vehicle-operator system, such as that of a taxi company operating a fleet of which the vehicle 10 belongs, or of an operator of a ride-sharing service.

Example inputs from the vehicle sensor sub-system 60 include and are not limited to:

- environment sensors providing data about conditions about a vehicle, such as from external camera, distance sensors (for instance, LiDAR, radar), and temperature sensors, precipitation or moisture sensor, or any sensor for sensing or measuring characteristics of an environment of the vehicle.
- vehicle dynamics or kinematics sensors, such as vehicle speed (for instance, tire-rotation) sensor, vehicle acceleration or other movement, such as an inertial-momentum unit (IMU), having one or more accelerometers, a vehicle pose or other dynamics, such as position, speed, acceleration, or height—for instance, vehicle height sensor, brake sensors, steering angle sensor, any other sensors for providing any vehicle gauge or telematics information;
- bio-metric/physiological sensors providing bio-metric data regarding vehicle occupants, such as facial features, voice recognition, heartrate, salinity, skin or body temperature for each occupant, etc.;
- vehicle-occupant input devices, such as vehicle human-machine interfaces (HMIs), such as a touch-sensitive screen, buttons, knobs, microphones, personal mobile devices (wearable devices, personal phones, personal tablets, the like and other), and, in some embodiments, in-vehicle devices such as tablets, projectors, virtual reality devices, whether built into the vehicle or readily removable from the vehicle; and
- cabin sensors providing data about characteristics within the vehicle, such as vehicle-interior temperature, in-seat weight sensors, and motion-detection sensors.

The view also shows example vehicle outputs 70, and user devices 34 that may be positioned in the vehicle 10. Outputs 70 include and are not limited to:

- audio-output component, such as vehicle speakers $70_1$;
- visual-output component, such as vehicle screens $70_4$;
- vehicle-kinematics or dynamics actuators, such as those affecting autonomous driving (e.g., vehicle brake, throttle, or steering gear)—a steering wheel is shown by way of example;
- local devices 34 and remote systems 34/50, to which the system may provide a wide variety of information, such as user-identifying data, user-biometric data, user-history data, contextual data (weather, road conditions, etc.), instructions or data for use in providing notifications, alerts, or messages to the user or relevant entities such as authorities, first responders, parents, an operator or owner of a subject vehicle 10, or a customer-service center system, such as of the OnStar® control center; and
- control components, if not included in these devices, for controlling any of these.

The units, sub-units, and their functions are described more below.

V. SYSTEM FUNCTIONS AND ALGORITHMS—FIG. 4

V.A. Introduction to the Algorithms

Figure 4:
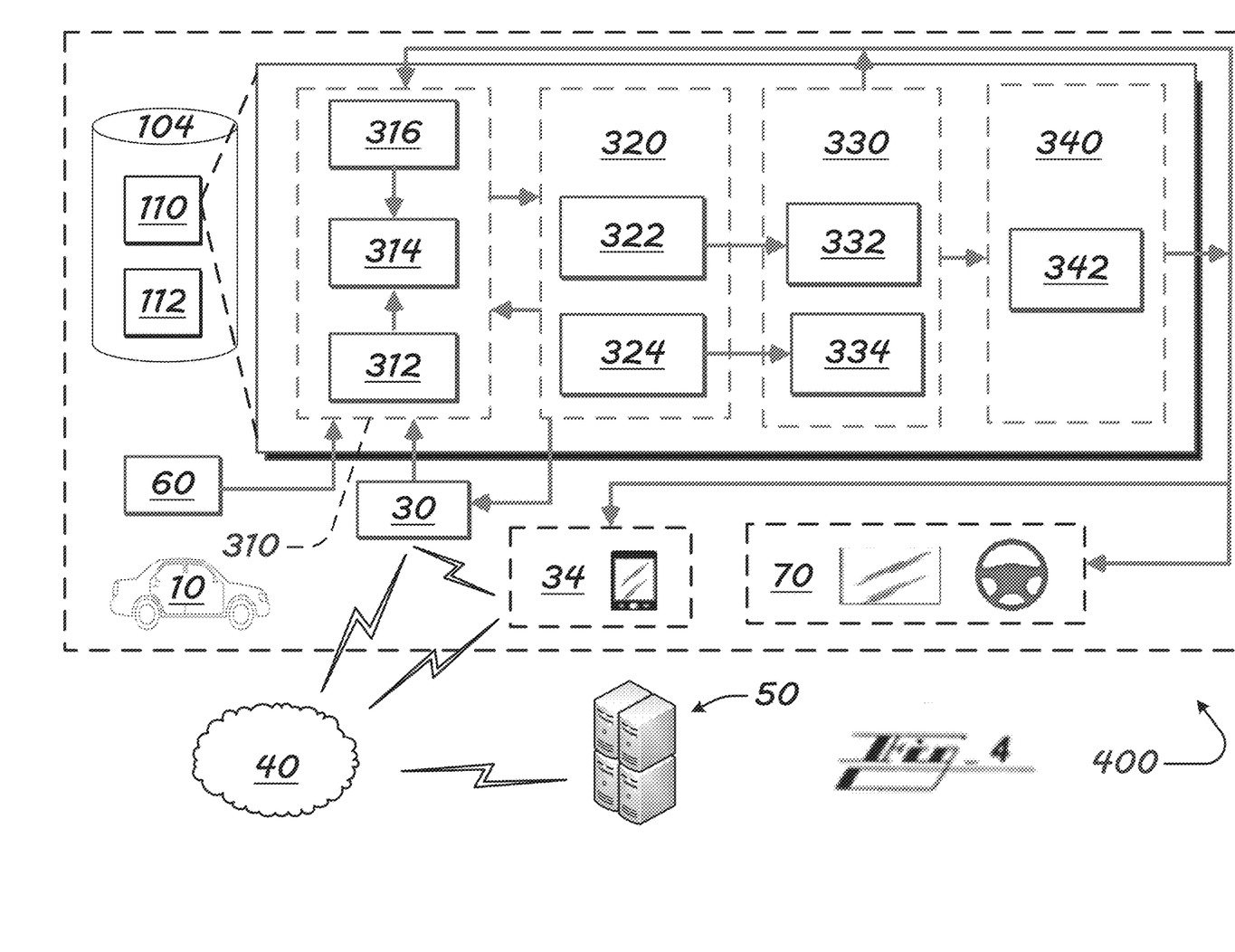
FIG. 4 shows interactions between components of FIG. 3, including with external apparatus.

FIG. 4 shows schematically a view 400 of the system components of FIG. 3 and various interactions between them as they perform their functions. Functions and interactions are performed according to one or more example algorithms, processes, or routines represented schematically by the flow shown, according to embodiments of the present technology. The algorithms, processes, and routines are at times herein referred to collectively as processes or methods for simplicity.

Though a single flow is shown for simplicity, any of the functions or operations can be performed in one or more or processes, routines, or sub-routines of one or more algorithms, by one or more devices or systems. The steps, operations, or functions of the processes are not necessarily presented in any particular order and performance of some or all the operations in an alternative order is possible and contemplated. The processes can also be combined or overlap, such as by one or more operations of one of multiple processes being performed in one of the other processes. The operations have been presented in the demonstrated order for ease of description and illustration. Operations can be added, omitted and/or performed simultaneously without departing from the scope of the appended claims. It should also be understood that the illustrated processes can be ended at any time.

In certain embodiments, some or all operations of the processes and/or substantially equivalent operations are performed by a computer processor, such as the hardware-based processing unit 106, a processing unit of a user mobile, and/or the unit of a remote device, executing computer-executable instructions stored on a non-transitory computer-readable storage device of the respective device, such as the data storage device 104 of the vehicle system 20.

The process can end or any one or more operations of the process can be performed again.

V.B. System Components and Functions

In FIG. 4, the input unit 310 receives input from any of a wide variety of sources. Input sources include vehicle sensors 60, such as camera, RADAR, and LiDAR just to name a few, and local or remote devices 34, 50, such as data storage components thereof. Input from extra-vehicle devices 34, 50 are received via the vehicle communication sub-system 30. Input sources also include any of the other units 320, 340, 350 in various embodiments—some of these feedback connections are shown schematically by arrow in FIG. 4.

The input unit 310 includes the visual-clutter sub-unit 312, the driver-context sub-unit 314, and the driving context sub-unit 316.

The visual-clutter sub-unit 312 in various embodiments obtains and/or generates data relevant to determining an amount of visual clutter in the driving environment. The data includes object data indicating position of objects in the driving environment sensed by vehicle sensors. Some or all of the object data is, in contemplated embodiments, crowd-sourced or otherwise received from extra-vehicle apparatus, such as from one or more other vehicles, mobile devices, or roadside infrastructure. The data may include, for instance, information about the location and dynamics of other objects—data from a nearby vehicle may indicate location and movement information about that nearby vehicle, or about still another nearby vehicle, for example.

Movement information may include, for instance, an object trajectory or predicted location at a certain future time—e.g., 0.5 seconds from now.

In various embodiments, sensing input thus includes at two types: presence of objects and trajectory of objects. At least the presence of objects affects the clutter calculation.

The system is in various embodiments configured to consider a nearby object as problematic, high-risk, or high-threat if position and dynamics of the object vis-à-vis the same for the subject vehicle 10 is within a threshold. For instance, if a time-to-collision (TTC), based on current positions and dynamics is 2 seconds, then object may be viewed as a high risk, depending again on the system settings. The threshold can be otherwise, such as a larger or smaller TTC, or using other variables, such as strictly distance from the vehicle 10.

However collected, data relevant to determining visual clutter is passed on for use by the scene-awareness estimation output unit 334, described more below.

In various embodiments, visual-clutter data includes a standard object list generated based on data input, such as vehicle sensor data. The standard object list indicates one or more objects in a vicinity of the vehicle 10. As described more below, the system is configured in some embodiments to adjust the standard object list, based on additional context—driver context and/or driving context, for instance, yielding an adjusted object list.

The driving-context sub-unit 316 obtains or generates data relating to the present driving scenario. Example driving-context information includes type of road—shape, condition, etc.—traffic, weather conditions, presence of nearby vehicles or objects, their positions, their movement characteristics, vehicle occupancy, vehicle type or capabilities—such as braking or cornering ability, and the like.

The driver-context sub-unit 314 obtains or generates data relating to conditions affecting the driver, whether the driver is a human user and/or the vehicle, such as in semi-autonomous driving. Driver-context information may include or be generated based on output from the other two input modules 312, 316, as shown schematically in FIG. 4, such as vehicle occupancy information, weather information, and visual-clutter information. In various embodiments, driver-context information can include any such type of information, such as vehicle-occupancy information, whether received from another unit 312, 316.

Example driver-context data includes information indicating driver or user state, or information about conditions that affect driver or user attention to vehicle driving. Example user state information includes information indicating user eye gaze, physiological measures, current activities, age, attentional capacity, visual clutter and other stimuli perceived by the driver.

Example physiological measures that may affect user attention to the driving scenario includes user temperature, electrocardiogram (ECG), electrodermal activity (EDA) or galvanic skin response (GSR), blood volume pulse (BVP), heart rate (HR), electroencephalogram (EEG), electromyography (EMG), blood-alcohol or other substance level, eye-blink or closure, or other eye-related measure, salinity level, the like, other, and any semantic or other interpretation of any such factor. These factors may indicate a surety or high likelihood that that the driver or user is anxious, intoxicated, distracted, or otherwise less able to appreciate needed determinations regarding present driving, such as how to maneuver or instruct the vehicle.

As mentioned, in various embodiments, driver state or condition includes eye gaze. The system includes structure for determining and analyzing user eye gaze, such as a semantic eye-gaze detector and any suitable underlying software. Gaze information may indicate for instance, that the driver is apparently looking briefly at a child in the back seat, directly or via a rear-facing mirror.

In some cases, the state or condition is generated based at least in part on the actions of or interactions with many users over time. For such user models, the performing system may use this historic multi-user data in combination with present and/or past actions of or interactions with a subject user. The historic data may be used, for instance, as a basis for adjusting or interpreting the present and/or past actions of or interactions with the subject user. Generating the model may include consideration of personal characteristics of the user, such as demographics data (age, gender, height, etc.), and/or characteristics of the other users. The system may correlate common characteristics in drawing conclusions about current activities of or interactions with the subject driver. Historic information indicating how attentive, or able to react to a situation or stimuli, other users and/or the subject user have been, can be used to interpret a present, similar situation, and such informing may be more valuable if it is determined first that there are commonalities between the past and present situations—e.g., same subject user, other user's had similar characteristics, similar time of day, lighting conditions, number of passengers, the like and other. In one embodiment, the system limits historic data to only data meeting a threshold of relevance, such as by relating to subject user and/or relating to any user whose situation is sufficiently similar, as defined by a designer of the system. User characteristics are in various embodiments entered explicitly by the users and in some cases can be learned from the system in connection with an experience or experiences. The historic data in various embodiments indicates patterns, of user action or interaction, which can be determined by the system, and used to interpret a present situation.

The driver context sub-unit 314 may use the information in various ways, such as simply to determine whether a user likely notices or fully appreciates an object or presented vehicle communication.

In various embodiments, the user model is used during the drive by the vehicle system, and the system may adjust the user model during the drive as well. The user model may be updated by the system, during and/or between drives, with values or other data indicative of driver activity or tendencies (e.g., reaction time to certain stimuli, such as time to notice an object coming from the right into the vehicle path), mannerisms, interactions with the vehicle, preferences, the like and other. Updates may include adding another user, such as a family member, a new user of a rental car, a new employee of a fleet car, the like or other.

The sub-unit 314 is configured to generate an awareness map based on the eye-gaze information in various implementations. The generation may be performed dynamically, changing the map in response to other system activities, such as in response to determining that a particular object is now very proximate and/or now qualifies as a threat to driving, or that the driver apparently does not or may not notice or appreciate the threat.

The system is configured in various embodiments to determine driver or user state based on a dynamic user model. The model can use data regarding the user and/or other users, whether learned on-line, in actual driving scenarios and/or off-line, such as by questions presented to the user. The resulting model, or user profile, can be stored locally, at the vehicle 10, or remote, such as in a cloud server. The user model being dynamic in various embodiments includes the system learning over time to improve the model, such as based on feedback related to present and/or historic activity, interactions, etc., for the subject driver and/or other drivers, related to a single present or past driver and/or multiple drivers.

Example driver-context data can also include, or be generated based on, past or present information about a subject driver and/or other drivers. The data can include, for instance, statistical information about past performance of or experiences with the subject driver, or other drivers, such as how they responded to certain stimuli, response times, and manner of response to certain environmental conditions and/or vehicle alerts.

Supporting data may be received from various sources including vehicle sensors and extra-vehicle sources, such as by crowd sourcing, nearby vehicles, mobile devices, infrastructure, or remote servers 50.

With continued reference to the structure of FIG. 4, the activity unit 320 determines activity results that can be used by the vehicle 10 in determining how to better interact with the driver, improve autonomous driving, and/or how to communicate with extra-vehicle apparatus to improve a present driving scenario.

Improved interactions with the user may include, for instance, providing earlier notification to the user about a nearby object, a needed maneuver (turn, etc.), or other, or accentuating the notification selectively.

An example accentuation of notifications includes increasing a visibility or volume, tone, number of modalities—from visual alert to visual and haptic, and sound alert—in providing an alert—or other manners of increasing a likelihood that the user will perceive the notification.

The accentuation in various embodiments includes accentuating a particular component of a notification, such as by making larger, brighter, or a different color in a display screen, an important or threatening object that the user may not notice or appreciate fully—such as a notification indicating simply presence of the object or a time or distance to impact.

In contemplated embodiments, a notification is provided in a heads-up display or type of virtual-reality display in which the notification is provided in at position at the vehicle so that the driver sees the notification in connection with their view of the actual object or area. For instance, if the system determines, based on present driver distraction or high clutter, that the driver may not or likely does not appreciate the imminent nature of a pedestrian being approached or a turn needed, for navigation or to avoid an object, the system may highlight the object or area in a display adjacent or at the vehicle windshield or window.

In various embodiments, a notification for a vehicle user is provided to the user by a user device, such as a phone or smartwatch. This arrangement may be particular helpful in partial or especially fully autonomous driving scenarios in which the user may not be in position or otherwise prepared to sense notifications provided for receipt by a driver in driving position and pose.

Instead of or with such highlighting, the system can provide relevant text, symbols, audio (tone, words, etc.), haptic output, the like, or other, by any vehicle output components. While in some embodiments the highlighting is provided at a basic level in response to the determinations of the system, in other embodiments, the vehicle 10 highlighting is enhanced in response to the determinations, such that a lower level of notification is provided if the driver or user is not determined to be distracted or otherwise less likely to fully appreciate the driving scene.

Regarding partially or fully autonomous driving, activity results from the activity unit 320 can include accentuated instructions causing the vehicle to perform maneuvers in a safer or otherwise more effective manner. As an example, if the unit 320 determines that the driving environment is highly cluttered, such as the Times Square example mentioned, and especially if there was also heavy rain, glare, or other factor limiting visibility, the activity results, may cause the vehicle to slow more than the vehicle would if it considered only following distance to a leading vehicle. In the case of adjusting an autonomous-driving function in a high-clutter scenario, one rational for making such change is to compensate for the possibility that presence and position determinations—from vehicle sensors, other-vehicle data received from other vehicles or nearby infrastructure, etc.—may not be as reliable as such determinations would be in a low-clutter scenario.

In various embodiments, the output-structuring unit 330 includes an alert-assessment output sub-unit 332 and the scene-awareness output sub-unit 334, to process the output of the user-centric alert assessment sub-unit 322 and the scene-awareness estimation output unit 334, respectively.

The output sub-units 332, 334 may each or together include or be referred to as an automated-decision support sub-system. The sub-units determine instructions, messages, signals, or other structures appropriate based on the score and environmental-clutter information output by the user-centric alert assessment sub-unit 322 and the scene-awareness estimation output unit 334, respectively.

In various embodiments, the user-centric alert assessment sub-unit 322 determines a threat-assessment value or score, or other useful output, based on the mentioned driver-context information. The user-centric alert assessment sub-unit 322 may also consider the mentioned driving-context information and environmental-clutter information, separately or, as referenced, either or both of these can be incorporated into the driver-context information.

The user-centric alert-assessment score can be provided according to any suitable scale, protocol, or format, such as on a scale of 0.0 to 10.0, 1 to 1000, levels 1-5, the like or other.

The user-centric alert-assessment score can be used by the vehicle 10, or other apparatus, such as nearby vehicles or user devices—pedestrian phones, etc.—in determining next actions.

Next actions may include, for instance, controlling the vehicle, initiating communications to the user, and initiating control of operation of, or communications to (and possibly to and from), the other apparatus.

In various embodiments, the scene-awareness estimation unit 324 uses sensor data and/or other data, such as from extra-vehicle apparatus to compute an amount of visual clutter in an environment. Clutter can be based on camera and radar inputs, for instance, and use object trajectory data and data indicating high-threat objects.

The clutter measure is in various embodiments used to estimate a probability or likelihood that the driver is aware of one or more particular objects in the driving environment. With higher clutter, generally, the probability that the driver notices any object is lower. The probability is used in determining an alert strategy by which the driver is advised about the object(s).

As with the user-centric threat-assessment score, the clutter measure can be used by the vehicle 10, or other apparatus, such as nearby vehicles or mobile communication devices, in determining next actions. Again, next actions may include, for instance, controlling the vehicle, initiating communications to the user, and initiating control of operation of, or communications to (and possibly to and from), the other apparatus.

In various embodiments, the user-centric threat-assessment score is determined using at least one of two techniques: a rule-based technique and a machine-based technique.

The rule-based technique obtains or determines an avoid collision time—ACT. While the term focuses on collisions, which normally relates to collisions affecting a vehicle body, the concept can be extended to include other objects, such as potholes, or maneuvers, such as a vehicle turn needed to follow navigation. The ACT is determine based on any of driver context, driving context, and clutter information, for example.

The ACT represents an amount of time that a driver will take to react to a subject threat or make a needed maneuver appropriately. A driver with no impairments (e.g., sight, attention) or distractions (e.g., phone call, clutter) can be referred to as a standard driver, and associated with a standard ACT, for instance.

A driver's capability to react when arguing with a passenger is smaller than when the driver is driving alone and relaxed. When the driver's determined capability is smaller, the corresponding ACT regarding the driver and any nearby object is larger. One of the potential outputs to address the capability shortcoming is to advise the driver earlier of an approaching object, object being approached, needed maneuver, or the like.

In various embodiments, the ACT is determined as a function of a time to collision (TTC)—the amount of time before an event, such as a collision, hitting a pothole, or being at a point of needed maneuver. TTC is based on current dynamics (vehicle and object spacing and dynamics), and not user specific.

In various embodiments, the system is configured to, for any context and driver, adjust ATC to a new, adjusted ACT as a function of any one or more of driver context, driving context, clutter information, and TTC.

As an example, assume that ACT corresponding to an elderly driver talking on the phone is 3 seconds. An alert should thus be provided to the driver at an ACT of at least 3 seconds, even if the system would not normally be provided until TTC is 1.8 seconds.

For the rule-based technique of determining the threat-assessment score, the alert-assessment output sub-unit 332 comprises code defining at least one rule for determining the score based on various factors.

As an example, one rule may state that:
If (driver on phone) and (age>55), then ACT=3 secs.
As another example, a rule may state that:
If (weather=rain) and (age>55), then ACT=3 secs.
If the determined ACT is greater than the TTC, then perform action X, wherein:
X=alert the driver earlier than the TTC time before the event (collision, pothole, etc.), and at least by the ACT time before the event.
If the determined ACT is less than the TTC, then Y, wherein:
Y=Providing the alert at the TTC is sufficient, and at the ACT acceptable.

In some embodiments, Y also includes advising the user, such as with advice proposing that the user advise a child who entered the road and was not sensed easily or early, to be more careful, or to advise the user to be more attentive or less distracted (e.g., no phone use while driving).

For the machine learning approach to determining the threat-assessment score, the alert-assessment output sub-unit 332 is configured with code to determine ACT statistically, such as based on a probability function. In various embodiments, the probability function is learned over time based on user performance in similar or various situations.

In some implementations, the alert-assessment output sub-unit 332 is configured to determine that under certain circumstances (which may include prevailing driver context, driving context, and clutter information), a present situation or object could be considered problematic or dangerous, even if a determined ACT value is smaller, or earlier, than a TTC for the object.

In various embodiments, the machine learning uses deep learning or a theorem such as the Bayes rule to determining a probability that a current state is problematic. Processing regarding the probability (P) that the current state (CS) is dangerous may involve, for instance:
If TTC>threshold (T), then P(CS)=dangerous (i.e., the current state is likely dangerous) and so should perform action X, wherein, X includes:
adjusting TTC to match ACT; and/or
initiating other action determined using the automated decision-support sub-system components associated with the alert-assessment output sub-unit 332, such as by determining an action based on the driver's context, driving context, and/or clutter information—e.g., emphasizing a notification to the user, sending a communication to a pedestrian mobile device, taking some control from the driver for temporary autonomous handling under the circumstance.
If TTC<threshold (T), then P(CS)≠dangerous, and so no special intervening action needed.

The threshold (T) is, in various implementations, a confidence level, and the scene-awareness estimation output sub-unit 334 determines that a present state is problematic if TTC is above the threshold (T).

As mentioned, the user-centric threat-assessment score can be used by the vehicle 10, or other apparatus, such as nearby vehicles or user devices (e.g., pedestrian phones), in determining next actions. The next actions may include, for instance, affecting control of the vehicle 10, affecting communications to the user of the vehicle 10, affecting operation of, or affecting communications to respective users of, or control of, the other apparatus.

The instructions or control are configured to increase the likelihood that the user is aware of one or more nearby objects or need to make a maneuver otherwise, such as in following navigation, for instance.

In addition to embodiments in which environmental clutter is considered in determining user context, environmental clutter can be used in system scene-awareness functions. The functions, performed by the scene-awareness estimation output sub-unit 334, in various embodiments include adjusting the standard object list, mentioned above, yielding the adjusted object list. The standard object list indicates, for instance, for each relevant object, any of position of object, direction of movement of the object, speed or velocity of the object, size or other dimensions or geometry of the object, and type of object.

The adjusting is performed based on any of various factors, such as driver context and/or driving context. The adjusted object list may be generated so as to accommodate for factors that are or likely are distracting the driver to some extent from appreciating and responding fully and appropriately to the objects in driving, or to appreciate or respond appropriately to alert from the vehicle regarding driving, such as in the case of full human driving or semi- or fully autonomous driving.

As a simple example, the adjusted object list may move effective position of an object, such as a high-risk object, such as a pedestrian, to a position closer to the vehicle, for thereby notifying the user earlier of the presence or proximity of the object. This could be helpful if the system has information indicating, or has determined, that the user has slow reflexes or is otherwise impaired and can benefit from the earlier notification.

The adjusted object list, in addition to the standard-object list features mentioned, can include, or be used to generate, an awareness, or probability-of-awareness factor [P(awareness), or simply (P)] regarding any object sensed in the vicinity, indicating a probability of awareness that the driver is aware of or fully appreciating presence, dynamics, or threat—imminent proximity, for instance—of any nearby object.

Variables for generating the probability of awareness include object information (position, dynamics, etc.), user gaze (e.g., direction, time or timing), visual clutter, driver attentiveness, or other indicator of driver context.

The probability (P) can be provided according to any suitable scale, format, or protocol, such as a percentage of likelihood (0-100%), a scale of 1-10, the like, or other.

In various embodiments, the probability (P) that the user is aware of a particular object (e.g., nearby vehicle) is set to, or kept at, a pre-set level, such as a level of 1 if basic requirements are met. Example requirements include: (i) a driver gaze is directed at the particular object recently (e.g., sometime in the last two seconds, or any amount of time that a designer determines suitable to set the system to use), (ii) the driver is not drowsy, and (iii) visual clutter in the scene is below a critical threshold (T). And to, otherwise, set probability to 2.

Or the base level can be 0, to set (P0 to if the requirements are satisfied, and 1 otherwise. Or any effective convention.

These approaches may be referred to as the rule-based technique for determining a probability (P) that the user is aware of an object.

In some embodiments, the system is configured to compute the probability (P) using a learned regression and/or simulation environment. The probability (P) may be determined, for instance, as a learn regression of input parameters given all the data collected in a simulation environment. This approach can be referred to as machine learning.

As with the user-centric threat-assessment score, the instructions or control generated, for implementation at the vehicle 10 or other apparatus—other vehicles, pedestrian device, etc.—and based on the adjusted object list or awareness probability, may be configured to increase the likelihood that the user is aware of one or more nearby objects or of a need to make a maneuver, such as to follow navigation or avoid a threat.

Instructions for affecting vehicle control, other apparatus control, or communications to users of the vehicle or other apparatus are in various embodiments configured based on any one or more of the user-centric threat-assessment score, the adjusted object list, and the awareness probability (P).

As provided, the implementation unit 340 includes an output-interface sub-unit 342. The output-interface sub-unit 342 processes output of the activity unit 330 in any way suitable toward sending resulting instructions, messages, or signals to destinations. Example destinations include a vehicle system, such as an intra-vehicle communication system or autonomous driving system. Other example destinations include extra-vehicle recipient apparatus, to which instructions for communication to a user of the apparatus or for control of the apparatus are sent. The processing may include formatting the output, for instance, for use at the destination. In various embodiments, the processing involves preparing the signal or messages for sending, may include initiating sending to the destination, and may include actually performing the sending.

By the implementation unit 340 or a destination apparatus—vehicle communication or autonomous driving systems, other-vehicle systems, etc.—the communicating via the vehicle or apparatus, vehicle or apparatus control, or other action is performed.

VI. ADDITIONAL STRUCTURE, ALGORITHM FEATURES, AND OPERATIONS

In combination with, or in the stead of, any of the other embodiments described herein, the present technology can include any structure or perform any functions as follows:

a) In various embodiments, the present systems and processes quantify a level of alert or threat by integrating driver context, driving context, and/or clutter information.

b) In various embodiments, user-centric alert-assessment and scene-awareness functions output values and/or structures—such as an alert-assessment score and an adjusted object list—that capture more precise understandings of a driving situation, including of any urgency of the driving situation, such as time to collision, potential harm, other cars involved, or people such as pedestrians, drivers, or passengers.

c) Alert-assessment scores may be used to determine whether any action is needed to lower the urgency level. Example actions include:

providing an earlier notification to the driver to better ensure they appreciate and respond appropriately to the object or perform a needed maneuver appropriately;

providing an embellished or emphasized notification—such as one that is highlighted, of higher volume, particular colors, the like or other—to the driver to better ensure they appreciate and respond appropriately to the object or perform a needed maneuver appropriately;

Determining and implementing a gradual alert scheme to avoid false alarms when TTC is adjusted to be earlier than usual;

Sending notifications to extra-vehicle apparatus, such as other vehicles and pedestrian mobile devices;

Presenting alerts or notifications in the car by modality (ies) determined most appropriate under the circumstances—such as by providing haptic alert, with or without other modality alerts, when vehicle cabin noise is high;

Controlling or adjusting vehicle systems, such as automatic-cruise-control settings, other autonomous driving functions, infotainment settings (e.g., radio volume), the like and other;

Transferring partial or full driving responsibility to the driver from any level of autonomous driving—the transfer is in various embodiments performed with or after alerting the driver that the transfer is being made—e.g., "User intervention needed; Please take the steering wheel," or other advising and/or consoling communication; and Transferring partial or full driving responsibility to the vehicle from the driver—the system may accompany the transfer with a notification that the transfer is being made and/or that things are well—e.g., "Vehicle intervened to assist temporarily in driving, "everything is under control," or other advising and/or consoling communication.

d) Any of the functions described herein can be performed using artificial intelligence (AI) techniques.

e) In various embodiments, the present systems and processes, in support of determining how to adjust vehicle operations or initiate communication from the vehicle or other apparatus—other vehicles, pedestrian devices, etc.—perform any of: (1) sense the driving scene of the car (road conditions, car driving in the opposite lane, hazard ahead, crossing, pedestrians, obstacles), (2) determine a driver's state, and (3) determine a driving context and interpret these inputs together to decide on a score that is associated with the level of danger of the situation.

f) In various embodiments, the technology effectively filters environmental clutter or other inputs to the driver regarding driving, to simply driving and emphasize important items that the driver may not otherwise notice or appreciate fully. Example items include vehicle instructions or object in the driver's field of view (FOV).

g) In various embodiments, the system enables a process for estimating driver awareness to one or more objects in a vicinity of the vehicle. The system is configured to estimate a probability that the driver is aware of a particular object in the scene. The system can use the measure to enhance or otherwise affect an alert strategy of an active safety feature—e.g., driver assistance system. In some implementations, a result is a reduced amount of overall alerts, while maintaining a safety level that is the same as or comparable to what the vehicle would provide without the enhancement.

VII. SELECT ADVANTAGES

Many of the benefits and advantages of the present technology are described above. The present section restates some of those and references some others. The benefits described are not exhaustive of the benefits of the present technology.

The technology increases user acceptance of and confidence in the vehicle and its active safety features.

The system lowers distraction to the driver by providing the driver with relevant information corresponding to present circumstances—such as driving context, driver's context, and clutter—and/or by providing the information earlier and/or in a highlighted manner, avoiding threats earlier, and advising of maneuvers earlier, thereby avoiding need for advanced, higher-level alerts.

The system in various embodiment operates as a semantic parser of inputs sensed by the vehicle, whereby resulting vehicle notifications to the user and vehicle control, when applicable, are tailored to the present circumstance—including driver context, driving context, and/or clutter information—and not based, like conventional systems, only on relative position of the vehicle and nearby objects.

VIII. CONCLUSION

Various embodiments of the present disclosure are disclosed herein.

The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A user-centric driving-support system comprising:
   one or more vehicle sensors;
   a hardware-based processing unit; and
   a non-transitory computer-readable storage device comprising:
   an activity unit that, when executed by the hardware-based processing unit, determines, based on contextual input information, at least one of an alert-assessment output and a scene-awareness output, wherein the contextual input information is at least partially generated using output of the vehicle sensors and wherein the contextual input includes clutter information relating to an amount or quality of objects in an environment outside of a vehicle; and
   an output-structuring unit that, when executed by the hardware-based processing unit, determines an action to be performed at the vehicle based on at least one of the alert-assessment output and the scene-awareness output determined by the activity unit; and
   the activity unit, when executed by the hardware-based processing unit:
   receives or generates a standard object list, prepared based at least on output of the vehicle sensor; and
   adjusts the standard object list, based on the contextual input information, yielding an adjusted object list wherein the adjusted object list is based on the probability of the objects being problematic or dangerous such that the adjusted object list modifies the objects to be at least one of closer or higher quality; and
   the scene-awareness output includes the adjusted object list, whereby the hardware-based processing unit executes instructions for the action to be performed on the vehicle.

2. The user-centric driving-support system of claim 1, wherein the contextual input information is based at least in part on a user model generated using past characteristics of a present user and/or other users.

3. The user-centric driving-support system of claim 1, wherein the contextual input information includes user context, relating to a state or condition of a user of the vehicle.

4. The user-centric driving-support system of claim 3, wherein the state or condition of the user is determined based on (i) biometric data from user measurements, (ii) user activity, (iii) vehicle occupancy, and/or (iv) user eye gaze.

5. The user-centric driving-support system of claim 1, wherein the contextual input information includes driving context, relating to present driving conditions.

6. The user-centric driving-support system of claim 1, wherein the alert-assessment output comprises an alert-assessment score.

7. The user-centric driving-support system of claim 1, wherein the action determined by the output-structuring unit comprises controlling any one or more of: (i) a timing by which a driving-related notification is delivered by way of a vehicle output device, (ii) a substance of the driving-related notification, (iii) a modality or modalities for use in providing the notification, (iv) an amount of emphasis for use in providing the notification, and (v) a type of emphasis for use in providing the notification.

8. The user-centric driving-support system of claim 1, wherein the action determined by the output-structuring unit comprises one or both of:
controlling an automated driving component of the vehicle; and
generating a communication for delivery to a destination apparatus other than the vehicle.

9. A non-transitory computer-readable storage device, for implementation as part of a user-centric driving-support system, comprising:
an activity unit that, when executed by a hardware-based processing unit, determines, based on contextual input information, at least one of an alert-assessment output and a scene-awareness output, wherein the contextual input information includes or is generated using output of one or more vehicle sensors; and
an output-structuring unit that, when executed by the hardware-based processing unit, determines an action to be performed at a vehicle based on at least one of the alert-assessment output and the scene-awareness output determined by the activity unit;
wherein the activity unit, when executed by the hardware-based processing unit:
receives or generates a standard object list, prepared based at least on output of the one or more vehicle sensors; and
adjusts the standard object list, based on the contextual input information, yielding an adjusted object list; and
wherein the contextual input information includes at least clutter information relating to an amount or quality of visual objects in an environment outside of the vehicle based on probability of a current state likely being dangerous based on at least the following rules:
determining a probability that the current state is dangerous if a time to collision is greater than the threshold time taking into account contextual input information of clutter information gathered from vehicle sensors to determine a probability that the current situation is problematic or dangerous; and
the scene-awareness output includes the adjusted object list whereby the hardware-based processing unit executes instructions for the action to be performed on the vehicle.

10. The non-transitory computer-readable storage device of claim 9, wherein the contextual input information includes user context, relating to a state or condition of a user of the vehicle.

11. The non-transitory computer-readable storage device of claim 9, wherein the contextual input information includes driving context, relating to present driving conditions.

12. The non-transitory computer-readable storage device of claim 9, wherein an alert-assessment output sub-unit is configured with machine-learning code to determine a collision avoidance time statistically based on probability learned over time and further configured to determine that under certain circumstances based in part on clutter information whether an object could be considered problematic or dangerous even if a determined collision avoidance time value is smaller, or earlier, than a time to collision for the object.

13. The non-transitory computer-readable storage device of claim 9, wherein the alert-assessment output comprises an alert-assessment score.

14. The non-transitory computer-readable storage device of claim 9, wherein the action determined by the output-structuring unit comprises controlling any one or more of: (i) a timing by which a driving-related notification is delivered by way of a vehicle output device, (ii) a substance of the driving-related notification, (iii) a modality or modalities for use in providing the notification, (iv) an amount of emphasis for use in providing the notification, and (v) a type of emphasis for use in providing the notification.

15. The non-transitory computer-readable storage device of claim 9, wherein the action determined by the output-structuring unit comprises controlling an automated driving component of the vehicle.

16. The non-transitory computer-readable storage device of claim 9, wherein the action determined by the output-structuring unit comprises generating a communication for delivery to a destination device other than the vehicle.

17. A user-centric driving-support process comprising:
determining, by a hardware-based processing unit executing instructions of an activity unit of a non-transitory computer-readable storage device, based on contextual input information, at least one of an alert-assessment output and a scene-awareness output, wherein the contextual input information includes or is generated using output of at least one or more vehicle sensors collecting at least clutter information of objects external to a vehicle during driving conditions;
determining, by the hardware-based processing unit executing instructions of an output-structuring unit of the non-transitory computer-readable storage device, an action to be performed at the vehicle based on at least one of the alert-assessment output and the scene-awareness output determined by the activity unit;
wherein the activity unit, when executed by the hardware-based processing unit:
receives or determines a standard object list using one of more vehicle sensors' clutter information including at least an amount, distance, speed, or quality of the objects external to the vehicle during driving conditions;
generates an adjusted object list based on contextual input information wherein the standard object list is altered to the adjusted object list with at least one of greater amounts, shorter distances, faster speeds, or higher qualities of the objects based on probability of a current state likely being dangerous based on at least the following rules:

determining a probability that the current state is dangerous if a time to collision is greater than the threshold time taking into account contextual input information of clutter information gathered from vehicle sensors to determine a probability that the current situation is problematic or dangerous; and whereby the hardware-based processing unit executes instructions for the action to be performed on the vehicle.

* * * * *